US008125720B2

(12) United States Patent  (10) Patent No.: US 8,125,720 B2
Chang et al.  (45) Date of Patent: Feb. 28, 2012

(54) MINIATURE IMAGE CAPTURE LENS

(75) Inventors: Wei-Chung Chang, Taoyuan (TW); Jau-Jan Deng, Taipei (TW)

(73) Assignees: Omnivision Technologies, Inc., Santa Clara, CA (US); VisEra Technologies Company Limited, Hsinchu (TW)

( * ) Notice: Subject to any disclaimer, the term of this patent is extended or adjusted under 35 U.S.C. 154(b) by 471 days.

(21) Appl. No.: 12/409,982

(22) Filed: Mar. 24, 2009

(65) Prior Publication Data

US 2010/0246030 A1  Sep. 30, 2010

(51) Int. Cl.
*G02B 9/04* (2006.01)
(52) U.S. Cl. ......................................... 359/793; 359/708
(58) Field of Classification Search .......... 359/793–794, 359/717, 708
See application file for complete search history.

(56) References Cited

U.S. PATENT DOCUMENTS

2006/0262416 A1* 11/2006 Lee et al. .................. 359/645
2008/0130129 A1    6/2008 Boden et al.
2008/0130143 A1    6/2008 Oh et al.

FOREIGN PATENT DOCUMENTS

DE            2936237        3/1981

* cited by examiner

*Primary Examiner* — James Greece
(74) *Attorney, Agent, or Firm* — Muncy, Geissler, Olds & Lowe, PLLC

(57) ABSTRACT

A miniature image capture lens is disclosed, comprising a wafer scale lens system, which comprises a first lens group including a first substrate, a first surface disposed on a first side of the first substrate, a second surface disposed on a second side of the first substrate, and a second lens group including a second substrate, a third surface disposed on a first side of the second substrate, and a fourth surface disposed on a second side of the second substrate, wherein the first surface, the second surface, the third surface and the fourth surface are aspherical, one of the first surface and the second surface, and one of the third surface and the fourth surface have a high refraction index $Nd\_h$ and a high abbe number $Vd\_h$, another one of the first surface and the second surface, and another one of the third surface and the fourth surface have a low refraction index $Nd\_l$ and a low abbe number $Vd\_l$, and the miniature image capture lens meets the following conditions:

$Nd\_h=1.58\sim1.62$;

$Nd\_l=1.48\sim1.53$;

$Nd\_l/Nd\_h=0.91\sim0.97$;

$Vd\_h=35\sim45$; and $Vd\_l=25\sim35$, wherein one of the first and second surfaces is convex shaped and another one of the first and second surfaces is concave shaped, and one of the third and fourth surfaces is convex shaped and another one of the third and fourth surfaces is concave shaped.

20 Claims, 13 Drawing Sheets

MINIATURE IMAGE CAPTURE LENS

BACKGROUND OF THE INVENTION

1. Field of the Invention

This invention relates to a lens system, and more particularly relates to a wafer scale miniature image capture lens system.

2. Description of the Related Art

Mobile phones or personal computers employing imaging devices have become popular due to employment of solid-state image capture elements such as CCD (a charged coupled device) type image sensors, CMOS (a complementary metal oxide semiconductor) type image sensors and the like, allowing for higher performance and miniaturization of imaging devices. Additionally, there is demand for further miniaturization of image capture lenses loaded on the imaging devices.

However, despite demands, limits for further miniaturization of image capture lenses are being reached. As for the conventional image capture lenses, because they are true three dimensional structures and sensors therein need to also be miniaturized, it is difficult to control accuracy of lateral shift and tilt for each lens surface and fabrication thereof. Namely, fabrication tolerance is decreased.

FIG. 1 shows an imaging device using a published wafer scale lens module system. Light passes through the wafer scale lens modules 102 and 104 to the sensing element 106. In this art, the wafer scale lens modules 102 and 104 and the sensing element 106 can be fabricated by VLSI process technologies. Therefore, the image device can have a smaller size suitable for portable electronic devices, such as cell phones or personal digital assistants (PDAs). The wafer scale lens allows for further miniaturization along with technological advances driven by semiconductor processes such as Moore's law, as accuracy control is better. Moreover, while conventional lenses are fabricated by a discrete process, which assembles the lenses one by one, in contrast, the wafer scale lens is fabricated by a batch process, which can stack thousands of lens on a lens plate into a lens module array. However, despite the smaller volume, it is difficult to design a wafer scale optical lens system with good performance and high enough tolerance. Therefore, a wafer scale lens system with good performance and high tolerance is required.

Wafer scale optics has a lot of design constraints due to glass substrate structure and replication process limitations, such as limitations with lens material, substrate thickness, lens sag height and size, optical center alignment accuracy etc. For wafer scale lenses to become as main stream and as popular as plastic and glass lenses, wafer scale lens modules must have comparable optical design performance in accordance with appropriate manufacturing tolerance for the above described design constraints.

BRIEF SUMMARY OF INVENTION

According to the issues described, the invention provides a miniature image capture lens, comprising an aperture diaphragm having an aperture through which an image is captured and a wafer scale lens system. The wafer scale lens system comprises a first lens group including a first substrate, a first surface disposed on a first side of the first substrate, a second surface disposed on a second side of the first substrate, and a second lens group including a second substrate, a third surface disposed on a first side of the second substrate, and a fourth surface disposed on a second side of the second substrate, wherein the first surface, the second surface, the third surface and the fourth surface are aspherical, one of the first surface and the second surface, and one of the third surface and the fourth surface have a high refraction index $Nd\_h$ and a high abbe number $Vd\_h$, another one of the first surface and the second surface, and another one of the third surface and the fourth surface have a low refraction index $Nd\_l$ and a low abbe number $Vd\_l$, the high refraction index $Nd\_h$ is greater than the low refraction index $Nd\_l$, and the high abbe number $Vd\_h$ is greater than the low abbe number $Vd\_l$, and the miniature image capture lens meets the following conditions:

$$Nd\_h=1.58\sim1.62;$$

$$Nd\_l=1.48\sim1.53;$$

$$Nd\_l/Nd\_h=0.91\sim0.97;$$

$$Vd\_h=35\sim45; \text{ and}$$

$$Vd\_l=25\sim35$$

wherein one of the first and second surfaces is convex shaped and another one of the first and second surfaces is concave shaped, and one of the third and fourth surfaces is convex shaped and another one of the third and fourth surfaces is concave shaped.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The following descriptions are of the contemplated mode of carrying out the invention. This descriptions are made for the purpose of illustrating the general principles of the invention and should not be taken in a limiting sense, not for limiting the invention.

The invention is related to a wafer scale lens system which includes two-side optical surfaces on opposite sides of a glass substrate. The two surfaces of the lens of the invention can be made of two different materials, where one has a high refractive index and the other has a low refractive index and the lens material can be a UV curable polymer compound. As well, the invention provides a two-side wafer scale lens, and the lens presents high and low refraction index for the surfaces at either sides and has convex and concave shapes at either sides to minimize optical dispersion. Note that the high and low refraction index for the surfaces at either sides of the substrate can be achieved by using different materials for the surfaces on opposite sides of the glass substrate.

According to the design rules above, the lens structure of the invention can be designed to have different materials having different refraction indices at two sides and also have convex and concave shapes at either sides. Therefore, there are eight possible lens designs of the lens module of the invention, including (+h, −l, +h, −l), (+l, −h, +l, −h), (+h, −l, −l, +h), (+l, −h, −h, +l), (−h, +l, +l, −h), (−l, +h, +h, −l), (−h, +l, −h, +l), and (−l, +h, −l, +h), wherein +h means positive curvature and high refraction index, −h means negative curvature and high refraction index, +l means positive curvature and low refraction index, and −l means negative curvature and low refraction index.

Figure 1:
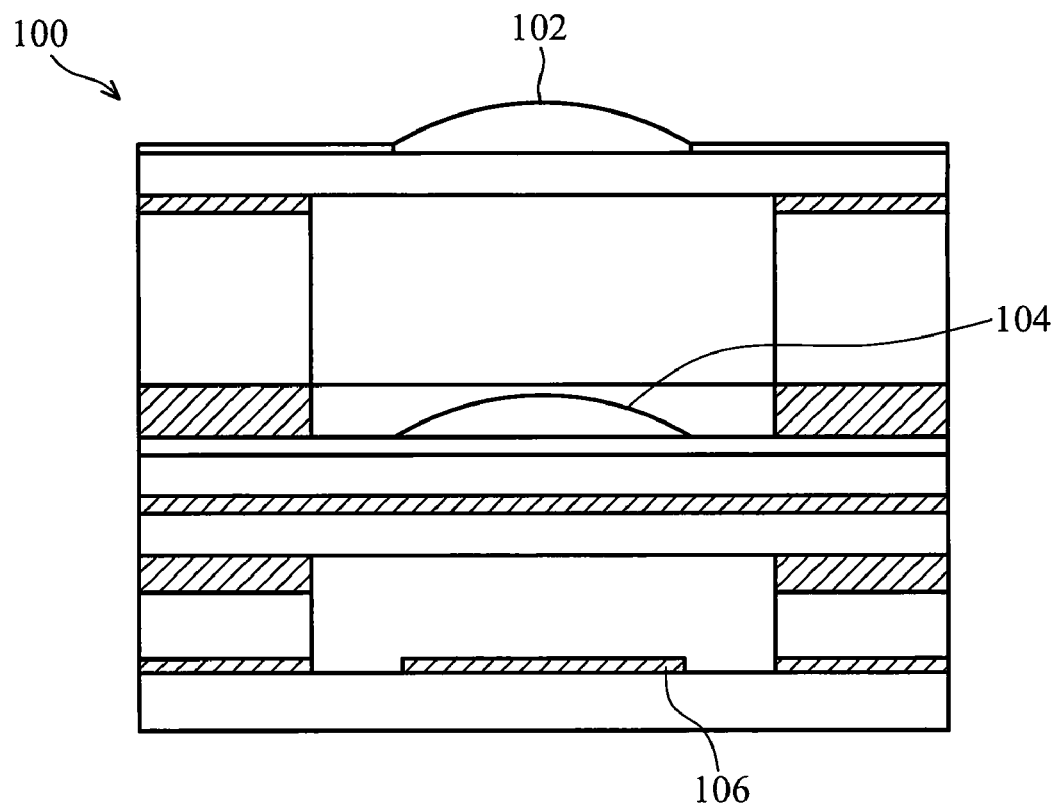
FIG. 1 shows an imaging device using a published wafer scale lens module system.
Figure 2A:
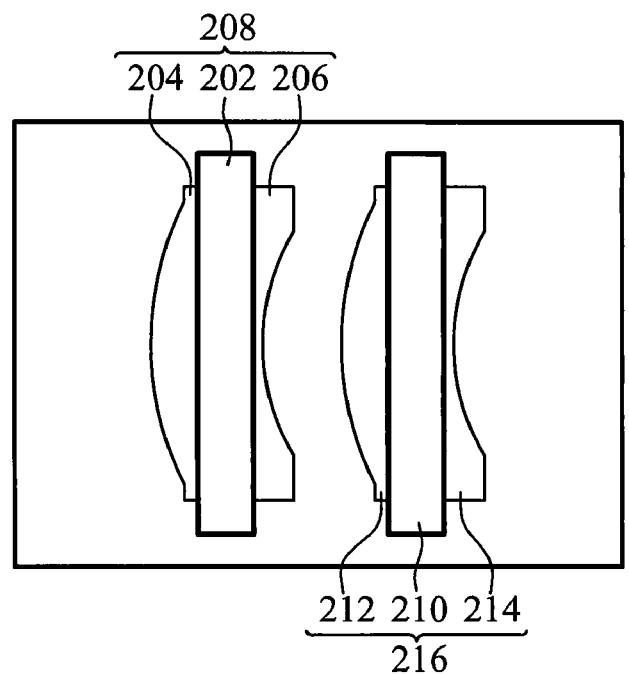
FIG. 2A shows a lens design of a first embodiment of the invention.

Referring to FIG. 2A, which shows a lens design of a first embodiment of the invention, a first substrate 202 and a second substrate 210 are provided, and a first surface 204 is disposed on the first side of the first substrate 202, a second surface 206 is disposed on a second side of the first substrate 202 to constitute a first lens group 208, a third surface 212 is disposed on the first side of the second substrate 210, and a fourth surface 214 is disposed on the second side of the second substrate 210 to constitute a second lens group 216. In the embodiment, the first surface 204 has high refraction index Nd_h, high abbe number Vd_h and convex shaped (positive curvature), the second surface 206 has low refraction index Nd_l, low abbe number Vd_l and concave shaped (negative curvature), the third surface 212 has high refraction index Nd_h, high abbe number Vd_h and convex shaped (positive curvature), and the fourth surface 214 has low refraction index Nd_l, low abbe number Vd_l and concave shaped (negative curvature).

Figure 2B:
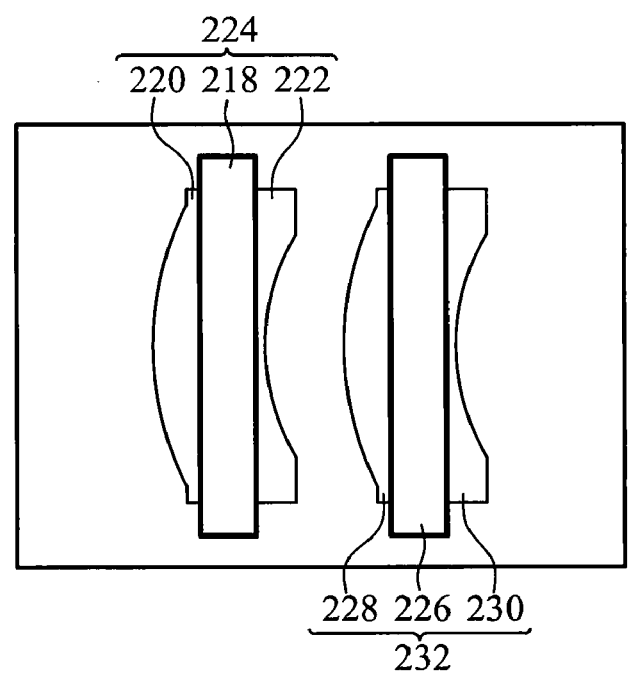
FIG. 2B shows a lens design of a second embodiment of the invention.

Referring to FIG. 2B, which shows a lens design of a second embodiment of the invention, a first substrate 218 and a second substrate 226 are provided, and a first surface 220 is disposed on the first side of the first substrate 218, a second surface 222 is disposed on a second side of the first substrate 218 to constitute a first lens group 224, a third surface 228 is disposed on the first side of the second substrate 226, and a fourth surface 230 is disposed on the second side of the second substrate 226 to constitute a second lens group 232. In the embodiment, the first surface 220 has low refraction index Nd_l, low abbe number Vd_l and convex shaped (positive curvature), the second surface 222 has high refraction index Nd_h, high abbe number Vd_h and concave shaped (negative curvature), the third surface 228 has low refraction index Nd_l, low abbe number Vd_l and convex shaped (positive curvature), and the fourth surface 230 has high refraction index Nd_h, high abbe number Vd_h and concave shaped (negative curvature).

Figure 2C:
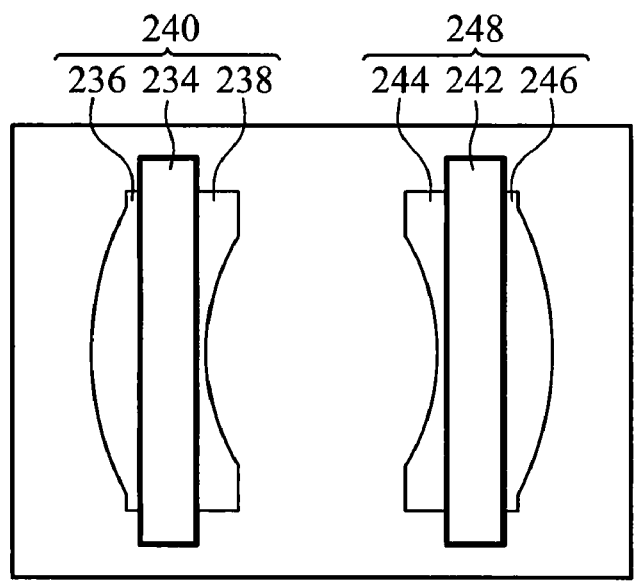
FIG. 2C shows a lens design of a third embodiment of the invention.

Referring to FIG. 2C, which shows a lens design of a third embodiment of the invention, a first substrate 234 and a second substrate 242 are provided, and a first surface 236 is disposed on the first side of the first substrate 234, a second surface 238 is disposed on a second side of the first substrate 234 to constitute a first lens group 240, a third surface 244 is disposed on the first side of the second substrate 242, and a fourth surface 246 is disposed on the second side of the second substrate 242 to constitute a second lens group 248. In the embodiment, the first surface 236 has high refraction index Nd_h, high abbe number Vd_h and convex shaped (positive curvature), the second surface 238 has low refraction index Nd_l, low abbe number Vd_l and concave shaped (negative curvature), the third surface 244 has low refraction index Nd_l, low abbe number Vd_l and concave shaped (negative curvature), and the fourth surface 246 has high refraction index Nd_h, high abbe number Vd_h and convex shaped (positive curvature).

Figure 2D:
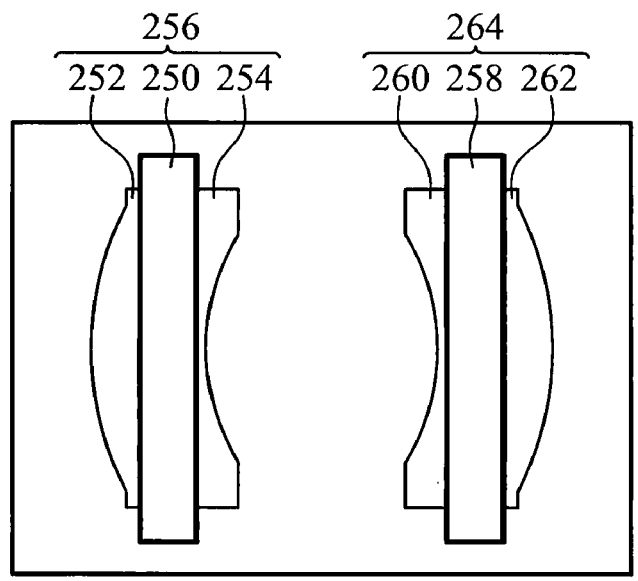
FIG. 2D shows a lens design of a fourth embodiment of the invention.

Referring to FIG. 2D, which shows a lens design of a fourth embodiment of the invention, a first substrate 250 and a second substrate 258 are provided, and a first surface 252 is disposed on the first side of the first substrate 250, a second surface 254 is disposed on a second side of the first substrate 250 to constitute a first lens group 256, a third surface 260 is disposed on the first side of the second substrate 258, and a fourth surface 262 is disposed on the second side of the second substrate 258 to constitute a second lens group 264. In the embodiment, the first surface 252 has low refraction index Nd_l, low abbe number Vd_l, and convex shaped (positive curvature), the second surface 254 has high refraction index Nd_h, high abbe number Vd_h and concave shaped (negative curvature), the third surface 260 has high refraction index Nd_h, high abbe number Vd_h and concave shaped (negative curvature), and the fourth surface 262 has low refraction index Nd_l, low abbe number Vd_l and convex shaped (positive curvature).

Figure 2E:
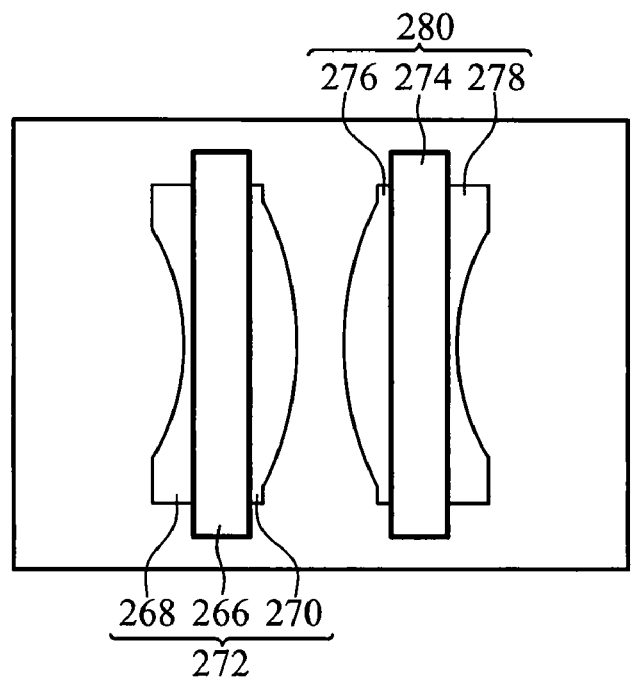
FIG. 2E shows a lens design of a fifth embodiment of the invention.

Referring to FIG. 2E, which shows a lens design of a fifth embodiment of the invention, a first substrate 266 and a second substrate 274 are provided, and a first surface 268 is disposed on the first side of the first substrate 266, a second surface 270 is disposed on a second side of the first substrate 266 to constitute a first lens group 272, a third surface 276 is disposed on the first side of the second substrate 274, and a fourth surface 278 is disposed on the second side of the second substrate 274 to constitute a second lens group 280. In the embodiment, the first surface 268 has high refraction index Nd_h, high abbe number Vd_h and concave shaped (negative curvature), the second surface 270 has low refraction index Nd_l, low abbe number Vd_l and convex shaped (positive curvature), the third surface 276 has low refraction index Nd_l, low abbe number Vd_l and convex shaped (positive curvature), and the fourth surface 278 has high refraction index Nd_h, high abbe number Vd_h and concave shaped (negative curvature).

Figure 2F:
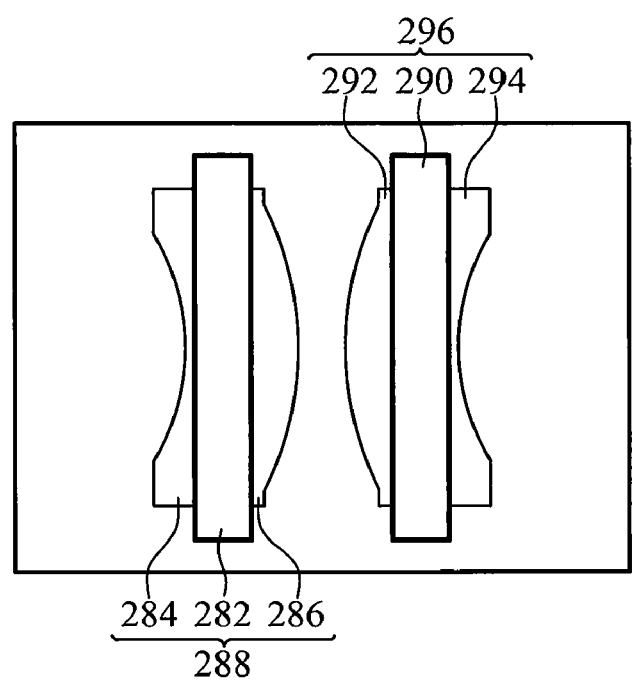
FIG. 2F shows a lens design of a sixth embodiment of the invention.

Referring to FIG. 2F, which shows a lens design of a sixth embodiment of the invention, a first substrate 282 and a second substrate 290 are provided, and a first surface 284 is disposed on the first side of the first substrate 282, a second surface 286 is disposed on a second side of the first substrate 282 to constitute a first lens group 288, a third surface 292 is disposed on the first side of the second substrate 290, and a fourth surface 294 is disposed on the second side of the second substrate 290 to constitute a second lens group 296. In the embodiment, the first surface 284 has low refraction index Nd_l, low abbe number Vd_l and concave shaped (negative curvature), the second surface 286 has high refraction index Nd_h, high abbe number Vd_h and convex shaped (positive curvature), the third surface 292 has high refraction index Nd_h, high abbe number Vd_h and convex shaped (positive curvature), and the fourth surface 294 has low refraction index Nd_l, low abbe number Vd_l and concave shaped (negative curvature).

Figure 2G:
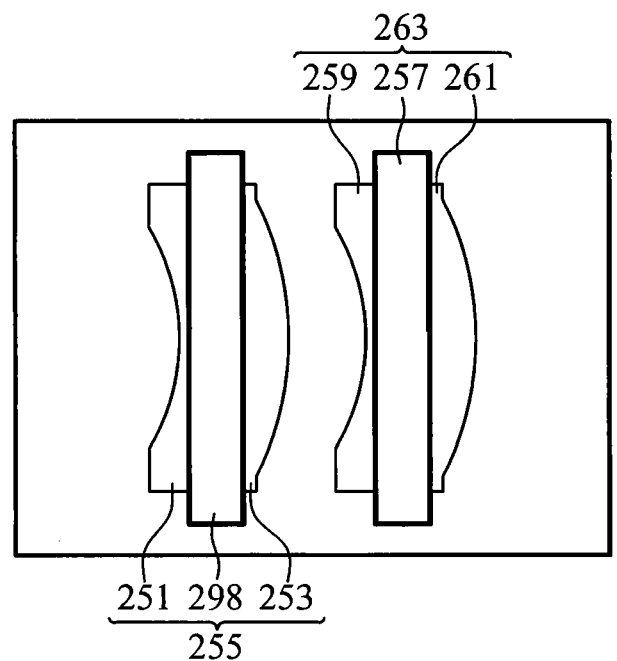
FIG. 2G shows a lens design of a seventh embodiment of the invention.

Referring to FIG. 2G, which shows a lens design of a seventh embodiment of the invention, a first substrate 298 and a second substrate 257 are provided, and a first surface 251 is disposed on the first side of the first substrate 298, a second surface 253 is disposed on a second side of the first substrate 298 to constitute a first lens group 255, a third surface 259 is disposed on the first side of the second substrate 257, and a fourth surface 261 is disposed on the second side of the second substrate 257 to constitute a second lens group 263. In the embodiment, the first surface 251 has high refraction index Nd_h, high abbe number Vd_h and concave shaped (negative curvature), the second surface 253 has low refraction index Nd_l, low abbe number Vd_l and convex shaped (positive curvature), the third surface 259 has high refraction index Nd_h, high abbe number Vd_h and concave shaped (negative curvature), and the fourth surface 261 has low refraction index Nd_l, low abbe number Vd_l and convex shaped (positive curvature).

Figure 2H:
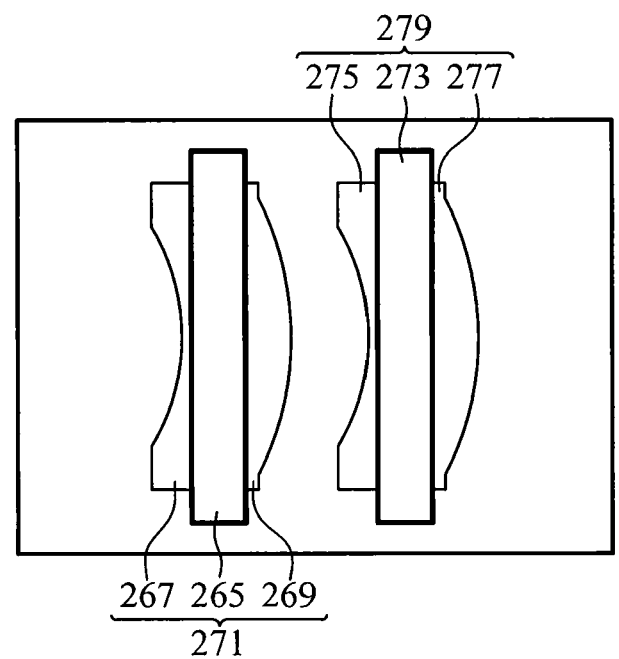
FIG. 2H shows a lens design of an eighth embodiment of the invention.

Referring to FIG. 2H, which shows a lens design of a eighth embodiment of the invention, a first substrate 265 and a second substrate 273 are provided, and a first surface 267 is disposed on the first side of the first substrate 265, a second surface 269 is disposed on a second side of the first substrate 265 to constitute a first lens group 271, a third surface 275 is disposed on the first side of the second substrate 273, and a fourth surface 277 is disposed on the second side of the second substrate 273 to constitute a second lens group 279. In the embodiment, the first surface 267 has low refraction index Nd_l, low abbe number Vd_l and concave shaped (negative curvature), the second surface 269 has high refraction index Nd_h, high abbe number Vd_h and convex shaped (positive curvature), the third surface 275 has low refraction index Nd_l, low abbe number Vd_l and concave shaped (negative curvature), and the fourth surface 277 has high refraction index Nd_h and convex shaped (positive curvature).

Figure 3:
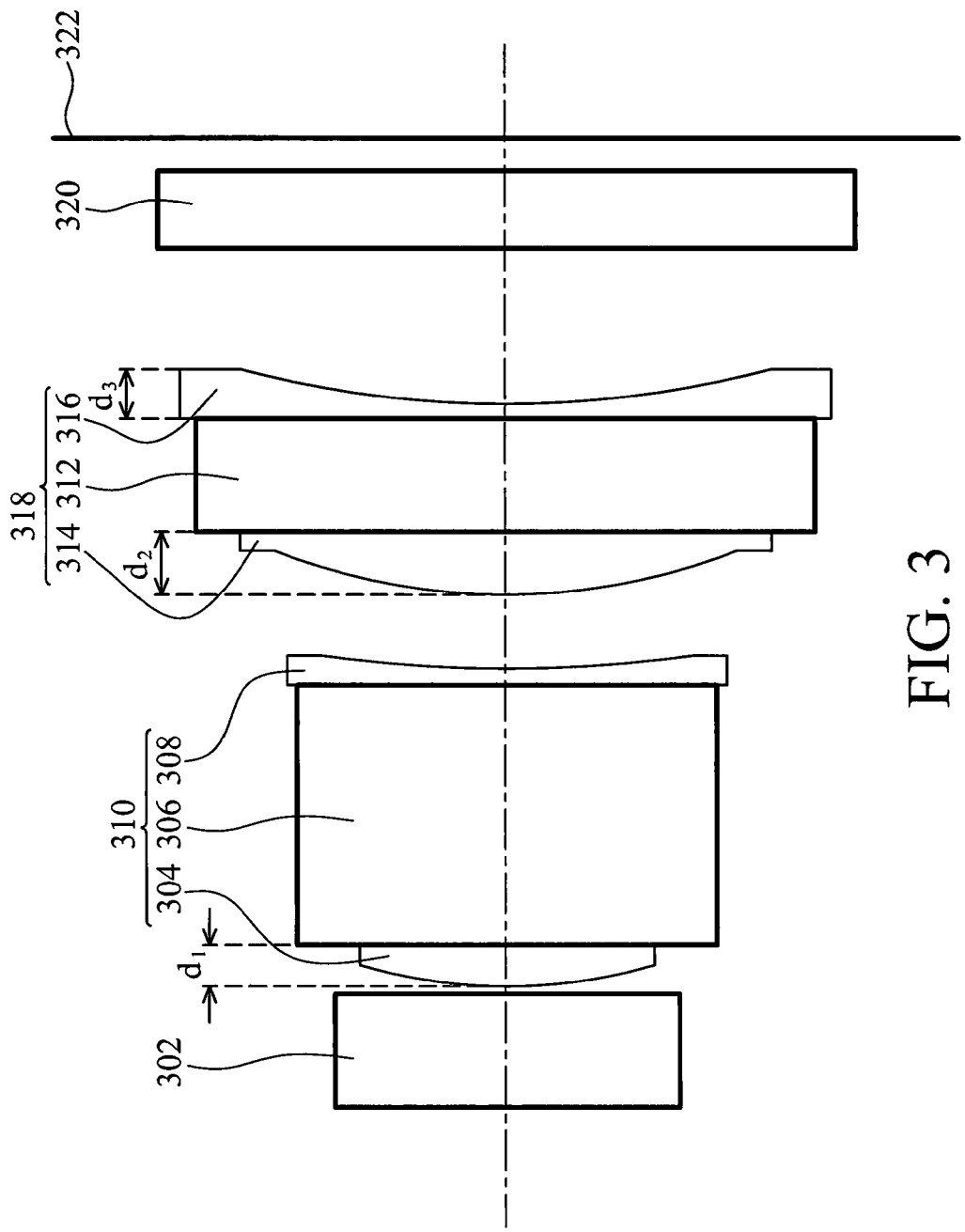
FIG. 3 shows a lens design of an example of the invention.
Figure 4:
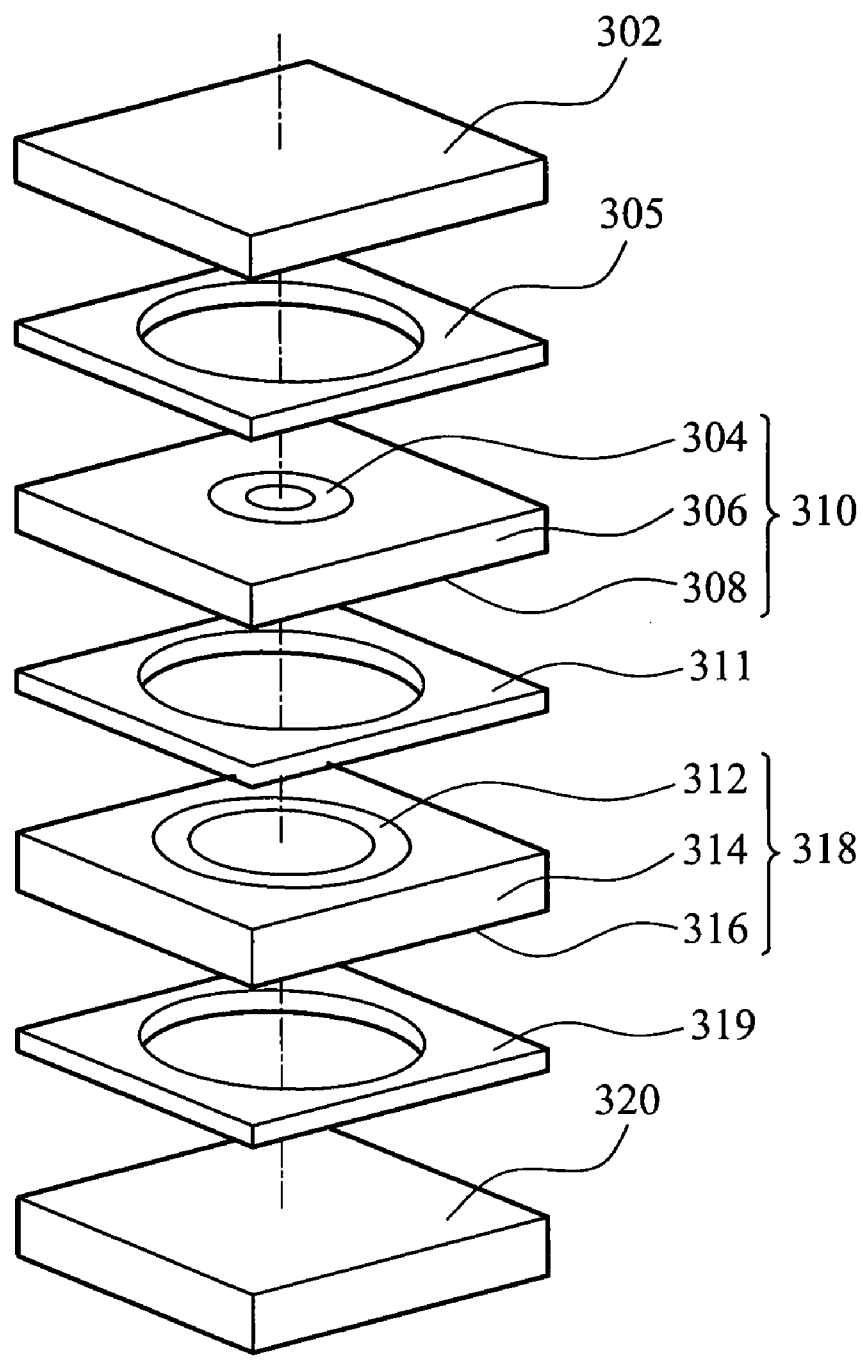
FIG. 4 shows an exploded view of an example of the invention.

Specifically, the first surface, the second surface, the third surface and the fourth surface are aspherical and the miniature image capture lens meets the following conditions:

$Nd\_h = 1.58 \sim 1.62;$ $Nd\_l = 1.48 \sim 1.53;$ $Nd\_l/Nd\_h = 0.91 \sim 0.97;$ $Vd\_h = 35 \sim 45;$ and $Vd\_l = 25 \sim 35$ Referring to FIG. 3, which shows a lens design of a example of the invention, the miniature image capture lens from the image to be captured (not shown) to an image plane 322 (or sensor) comprises a front cover glass 302, a first lens group 310 including a first substrate 306, a first surface 304 and a second surface 308 at opposite sides of the first substrate 306, a second lens group 318 including a second substrate 312, a third surface 314 and a fourth surface 316 at opposite sides of the second substrate 312, and a back cover glass 320. The first surface 304 and the third surface 314 have low refraction index, and the second surface 308 and the fourth surface 316 have high refraction index. In more detail, the first surface 304 has a center thickness $d_1$ of 100 μm, the third surface 314 has a center thickness $d_2$ of 169 μm, and the fourth surface 316 has an edge thickness $d_3$ of 125 μm. The third surface 314 has an aspect ratio of 0.14, and the fourth surface 316 has an aspect ratio of 0.07. Note that the first and second surfaces 304, 308 have aspect ratios that are less than that of the third and fourth surfaces 314, 316 in the example. Therefore, aspect ratios of the first and second surfaces 304, 308 are not a critical condition during fabrication and are not specifically described in the example. The distance from the fourth surface 316 to the image plane 322 is 0.55 mm and the miniature image capture lens has a total track length of 2.5 mm. The front cover glass 302 includes an aperture diaphragm having an aperture through which an image is captured and a IR cut filter can be coated on the front cover glass 302 or on the first surface 304 of the first lens group 310. Also referring to FIG. 4, which shows an exploded view of the example, the miniature image capture lens comprises a front cover glass 302, a spacer dam 305, a first lens group 310 including a first surfaces 304, a first substrate 306 and the second surfaces 308, a first spacer 311, a second lens group 318 including a third surfaces 312, a second substrate 314 and the fourth surfaces 316, a second spacer 319, and a back cover glass 320 from the top side to the bottom side. It is noted that the invention does not specifically limit the arrangement of the IR cut filter. For example, the IR cut filter can be formed on the front cover glass 302 or on the first surface 304 of the miniature image capture lens.

Figure 5:
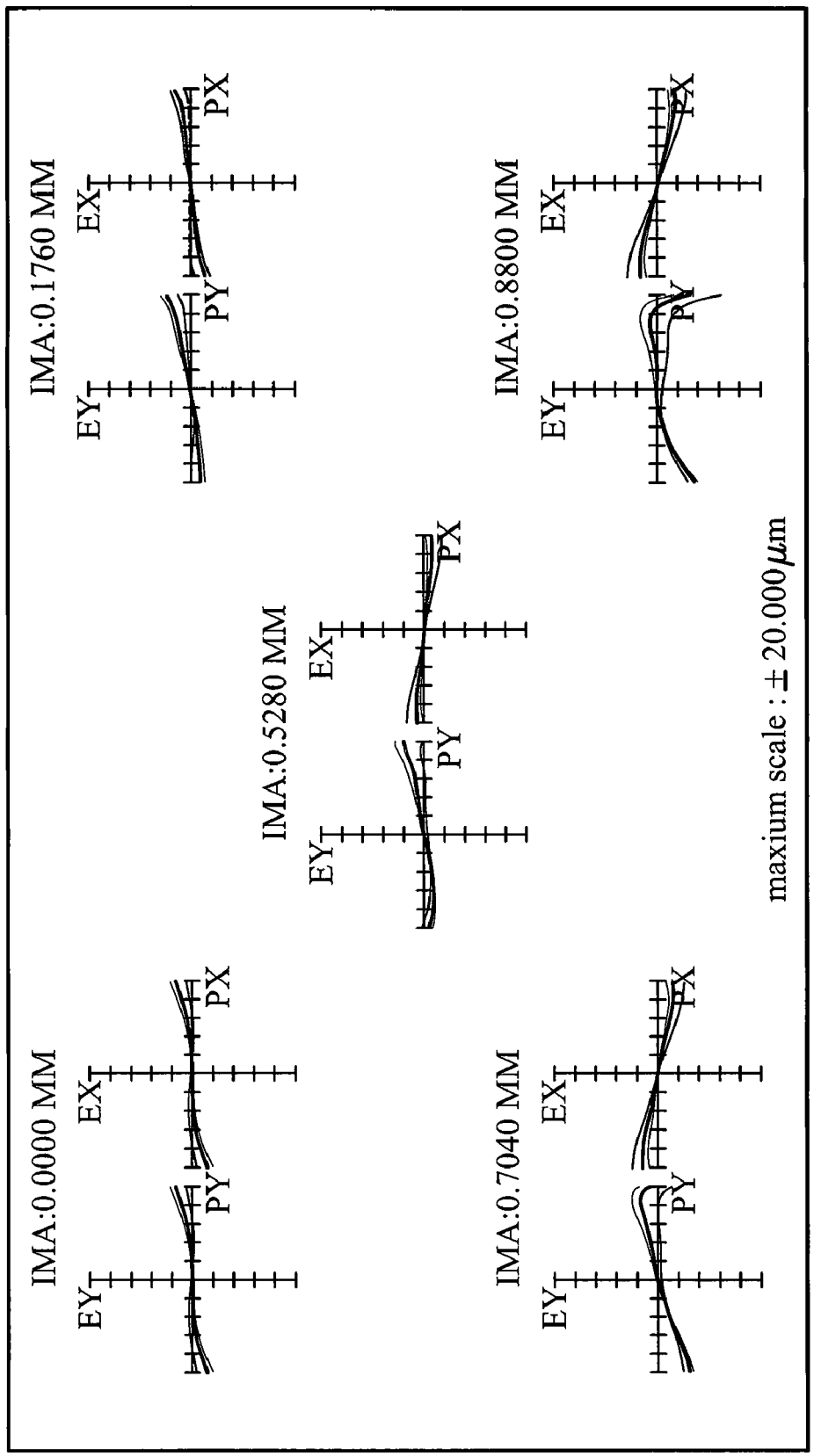
FIG. 5 shows aberration curves of a miniature image capture lens of an example of the invention.
Figure 6:
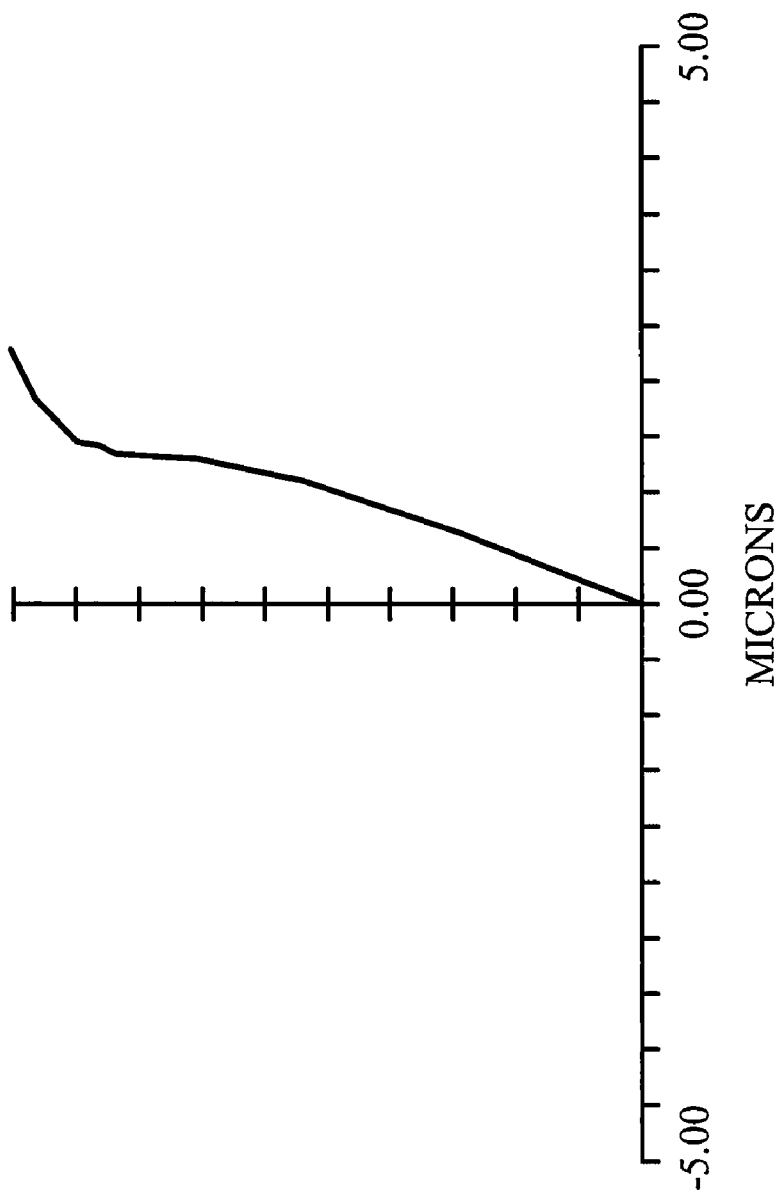
FIG. 6 shows lateral color of a miniature image capture lens of an example of the invention.
Figure 7B:
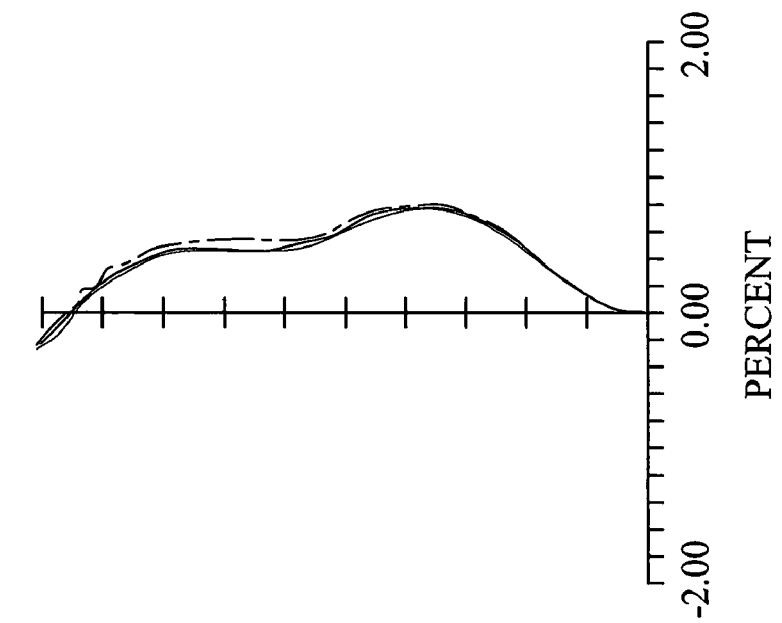
FIG. 7B shows distortion of a miniature image capture lens of an example of the invention.
Figure 7A:
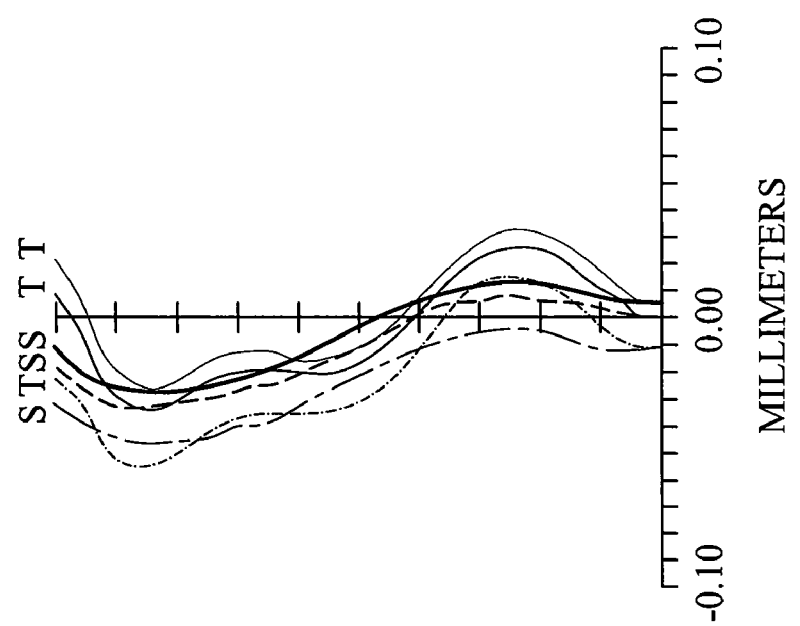
FIG. 7A shows field curvature of a miniature image capture lens of an example of the invention.
Figure 8:
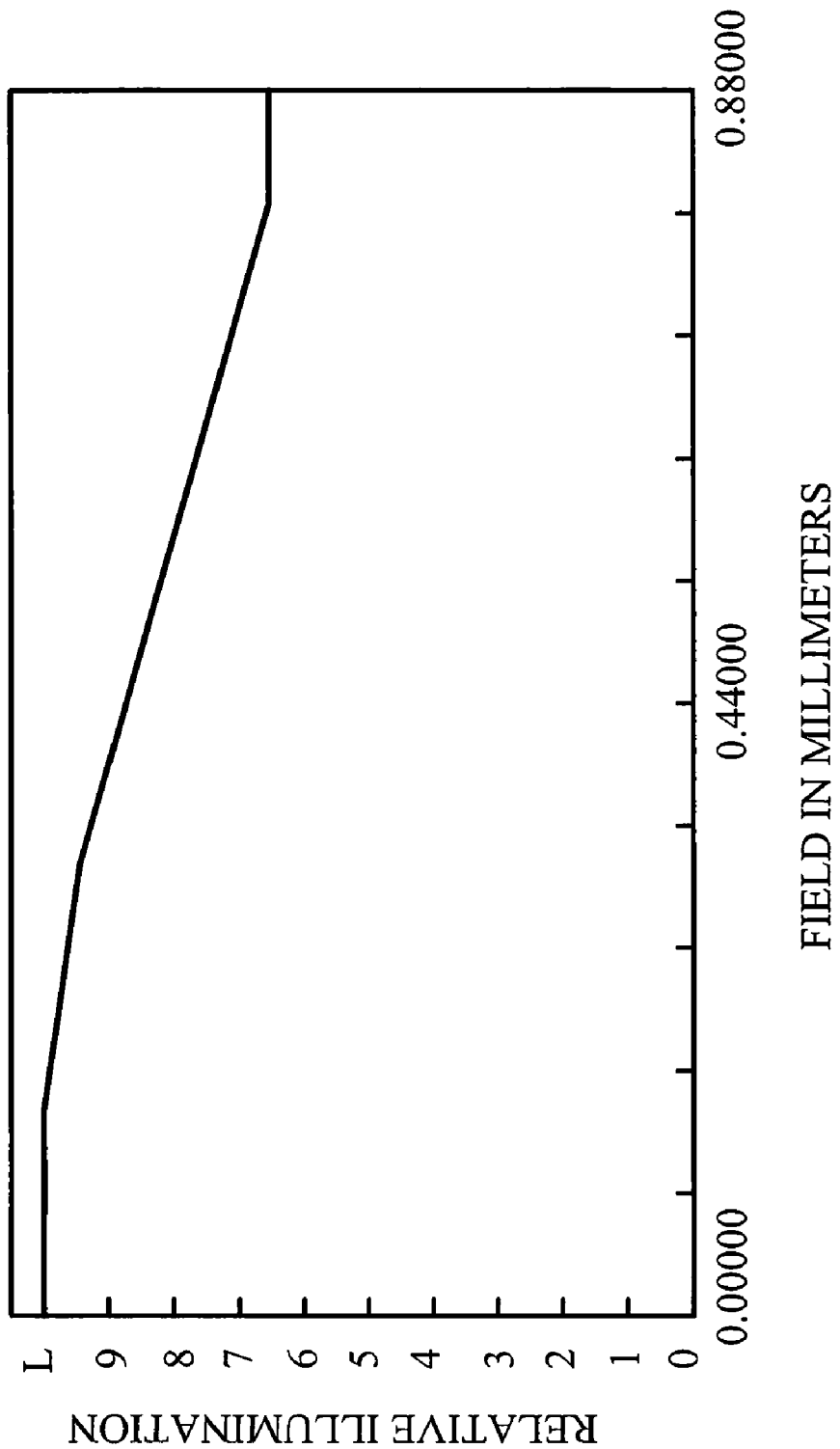
FIG. 8 shows relative illumination of a miniature image capture lens of an example of the invention.
Figure 9A:
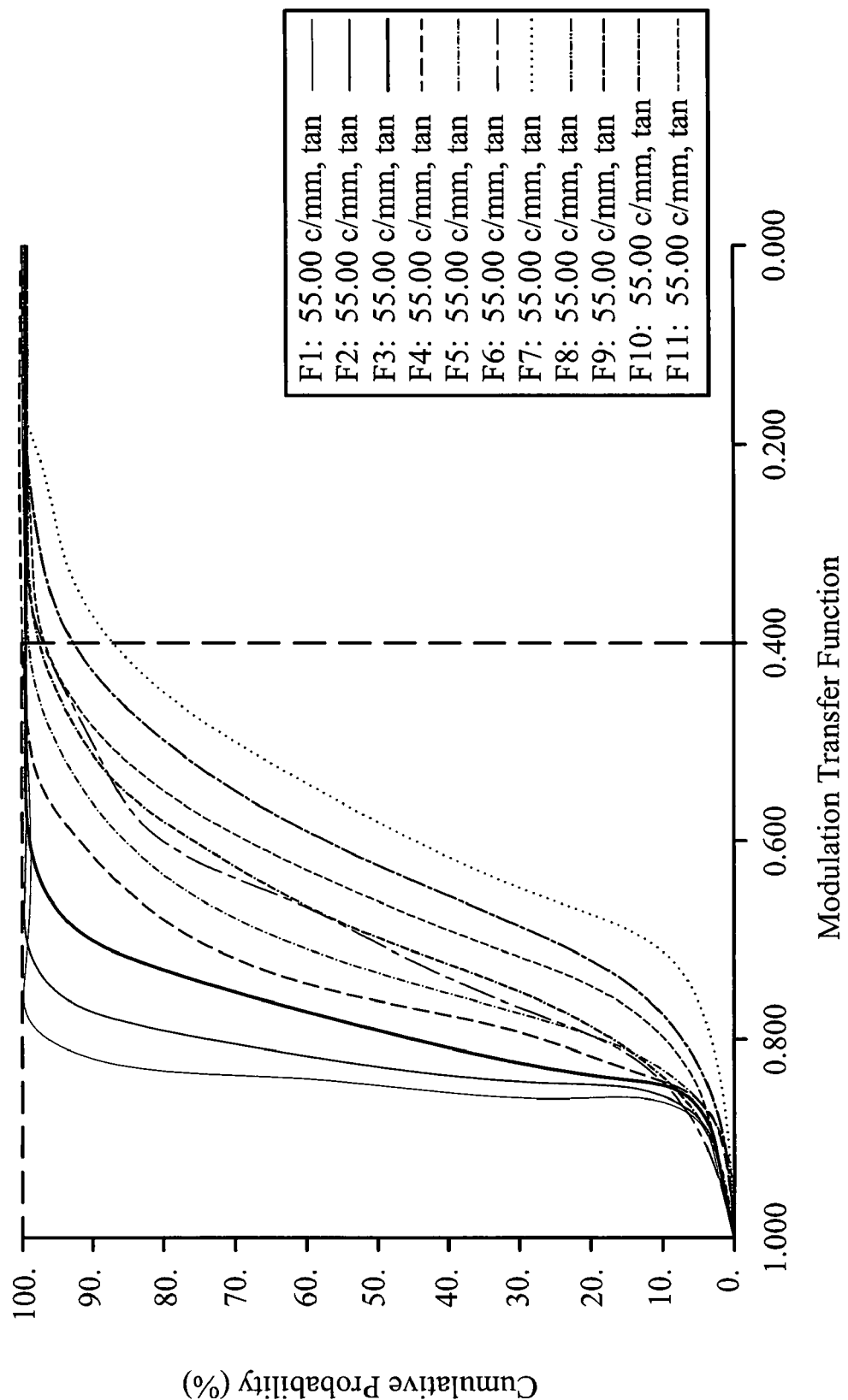
FIG. 9A shows tangential lines of tolerance analysis of an example of the invention.
Figure 9B:
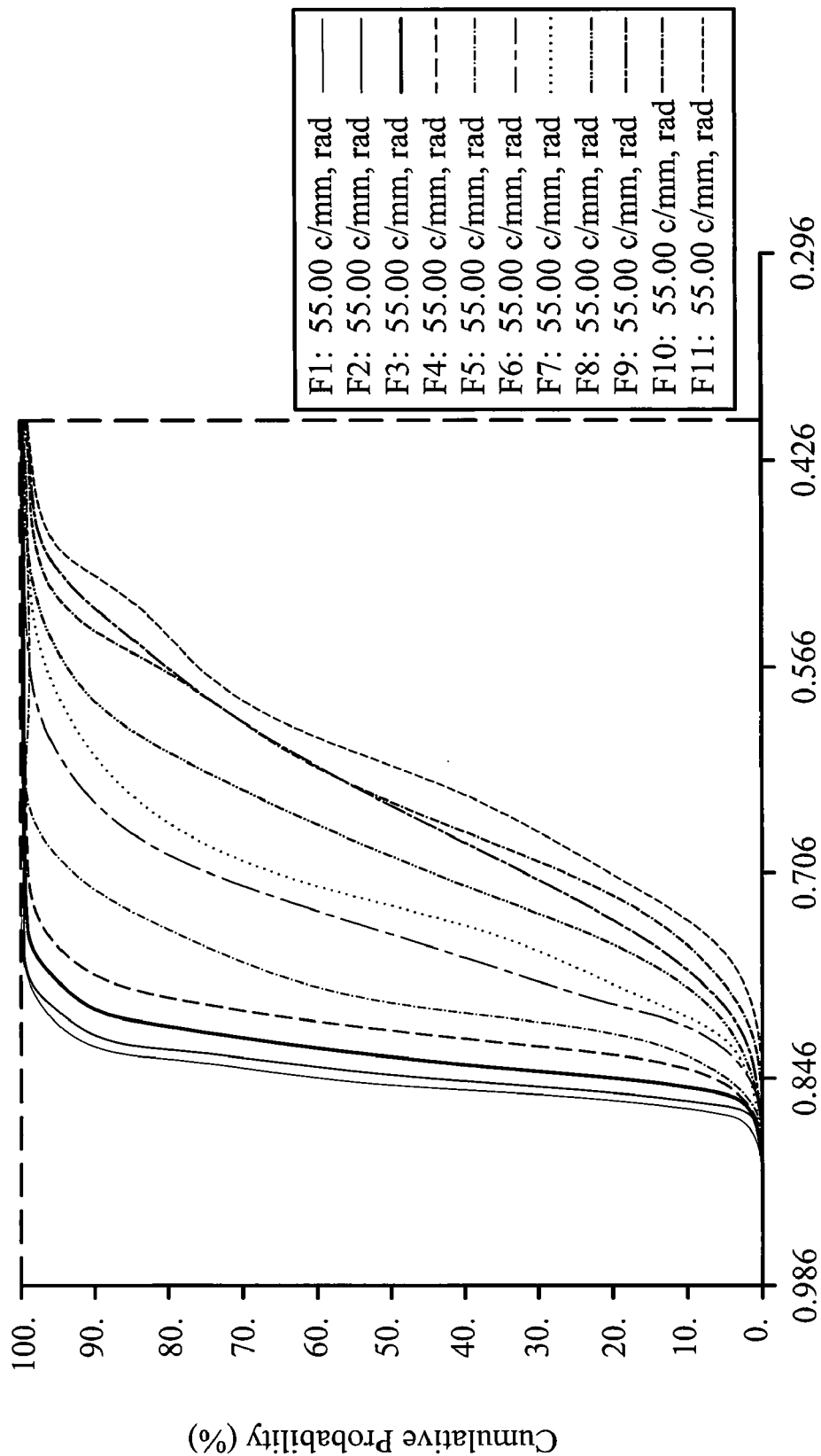
FIG. 9B shows sagittal lines of tolerance analysis of an example of the invention.

Referring in FIG. 5, which shows aberration curves of a miniature image capture lens of the example of the invention, the miniature image capture lens of the invention can achieve a small enough aberration. Referring in FIG. 6, which shows lateral color of a miniature image capture lens of the example of the invention, the miniature image capture lens of the invention can achieve good color aberration aspect performance. Referring in FIGS. 7A and 7B, wherein FIG. 7A shows field curvature of a miniature image capture lens of the example of the invention and FIG. 7B shows distortion of a miniature image capture lens of the example of the invention, the miniature image capture lens of the invention can achieve both good field curvature and distortion aspect performances. Referring in FIG. 8, which shows relative illumination of a miniature image capture lens of the example of the invention, the miniature image capture lens of the invention can achieve good illumination aspect performance. Referring in FIGS. 9A and 9B, wherein FIG. 9A shows tangential lines of tolerance analysis, and FIG. 9B shows sagittal lines of tolerance analysis and the tolerance analysis is based on ±10 μm decenter error, the yield rate can be as high as nearly 100% according to the criteria MTF>40 for a 0.8 field at ¼ Nyquist frequency.

According to the description above, the miniature image capture lens of the invention at least has the advantages as follows. First, the invention can form lens modules with different materials on different sides of the substrate to minimize optical dispersion. Specifically, the cost of fabricating the lens module is not substantially increased, because even for conventional wafer scale lens modules, the surfaces on the opposites of the substrate have to be formed in different process steps. Second, the IR cut filter can be coated on surfaces of the glass substrate. Third, the invention can achieve lens modules with shorter optical track length.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A miniature image capture lens, comprising:
    an aperture diaphragm having an aperture through which an image is captured; and
    a wafer scale lens system, comprising:
        a first lens group, including:
            a first substrate;
            a first lens disposed on a first side of the first substrate; and
            a second lens disposed on a second side of the first substrate; and
        a second lens group, including:
            a second substrate;
            a third lens disposed on a first side of the second substrate; and
            a fourth lens disposed on a second side of the second substrate,
        wherein the first lens, the second lens, the third lens and the fourth lens are aspherical, one of the first lens and the second lens, and one of the third lens and the fourth lens have a high refraction index $Nd\_h$ and a high abbe number $Vd\_h$, another one of the first lens and the second lens, and another one of the third lens and the fourth lens have a low refraction index $Nd\_l$ and a low abbe number $Vd\_l$, the high refraction index $Nd\_h$ is greater than the low refraction index $Nd\_l$, and the high abbe number $Vd\_h$ is greater than the low abbe number $Vd\_l$, and the miniature image capture lens meets the following conditions:

$Nd\_h=1.58\sim1.62$;

$Nd\_l=1.48\sim1.53$;

$Nd\_l/Nd\_h=0.91\sim0.97$;

$Vd\_h=35\sim45$; and $Vd\_l=25\sim35$.

2. The miniature image capture lens as claimed in claim 1, wherein the first lens has the high refraction index $Nd\_h$, the high abbe number $Vd\_h$ and is convex shaped, the second lens has the low refraction index $Nd\_l$, the low abbe number $Vd\_l$ and is concave shaped, the third lens has the high refraction index $Nd\_h$, the high abbe number $Vd\_h$ and is convex shaped, and the fourth lens has the low refraction index $Nd\_l$, the low abbe number $Vd\_l$ and is concave shaped.

3. The miniature image capture lens as claimed in claim 1, wherein the first lens has the low refraction index $Nd\_l$, the low abbe number $Vd\_l$ and is convex shaped, the second lens has the high refraction index $Nd\_h$, the high abbe number $Vd\_h$ and is concave shaped, the third lens has the low refraction index $Nd\_l$, the low abbe number $Vd\_l$ and is convex shaped, and the fourth lens has the high refraction index $Nd\_h$, the high abbe number $Vd\_h$ and is concave shaped.

4. The miniature image capture lens as claimed in claim 1, wherein the first lens has the high refraction index $Nd\_h$, the high abbe number $Vd\_h$ and is convex shaped, the second lens has the low refraction index $Nd\_l$, the low abbe number $Vd\_l$ and is concave shaped, the third lens has the low refraction index $Nd\_l$, the low abbe number $Vd\_l$ and is concave shaped, and the fourth lens has the high refraction index $Nd\_h$, the high abbe number $Vd\_h$ and is convex shaped.

5. The miniature image capture lens as claimed in claim 1, wherein the first lens has the low refraction index $Nd\_l$, the low abbe number $Vd\_l$, and is convex shaped, the second lens has the high refraction index $Nd\_h$, the high abbe number $Vd\_h$ and is concave shaped, the third lens has the high refraction index $Nd\_h$, the high abbe number $Vd\_h$ and is concave shaped (negative curvature), and the fourth lens has the low refraction index $Nd\_l$, the low abbe number $Vd\_l$ and is convex shaped.

6. The miniature image capture lens as claimed in claim 1, wherein the first lens has the high refraction index $Nd\_h$, the high abbe number $Vd\_h$ and is concave shaped, the second lens has the low refraction index $Nd\_l$, the low abbe number $Vd\_l$ and is convex shaped, the third lens has the low refraction index $Nd\_l$, the low abbe number $Vd\_l$ and is convex shaped, and the fourth lens has the high refraction index $Nd\_h$, the high abbe number $Vd\_h$ and is concave shaped.

7. The miniature image capture lens as claimed in claim 1, wherein the first lens has the low refraction index $Nd\_l$, the low abbe number $Vd\_l$ and is concave shaped, the second lens has the high refraction index $Nd\_h$, the high abbe number $Vd\_h$ and is convex shaped, the third lens has the high refraction index $Nd\_h$, the high abbe number $Vd\_h$ and is convex shaped, and the fourth lens has the low refraction index $Nd\_l$, the low abbe number $Vd\_l$ and is concave shaped.

8. The miniature image capture lens as claimed in claim 1, wherein the first lens has the high refraction index $Nd\_h$, the high abbe number $Vd\_h$ and is concave shaped, the second lens has the low refraction index $Nd\_l$, the low abbe number $Vd\_l$ and is convex shaped, the third lens has the high refraction index $Nd\_h$, the high abbe number $Vd\_h$ and is concave shaped, and the fourth lens has the low refraction index $Nd\_l$, the low abbe number $Vd\_l$ and is convex shaped.

9. The miniature image capture lens as claimed in claim 1, wherein the first lens has the low refraction index $Nd\_l$, the low abbe number $Vd\_l$ and is concave shaped, the second lens has the high refraction index $Nd\_h$, the high abbe number $Vd\_h$ and is convex shaped, the third lens has the low refraction index $Nd\_l$, the low abbe number $Vd\_l$ and is concave shaped, and the fourth lens has the high refraction index $Nd\_h$ and is convex shaped.

10. The miniature image capture lens as claimed in claim 1, wherein the first lens and the second lens are formed of different materials, and the third lens and the fourth lens are formed of different materials.

11. The miniature image capture lens as claimed in claim 1, further comprising a first spacer between the first lens group and the second group.

12. The miniature image capture lens as claimed in claim 1, further comprising a IR cut filter coated on the first lens of the first lens group.

13. The miniature image capture lens as claimed in claim 1, further comprising a back cover glass, and a second spacer disposed between the back cover glass and the second lens group.

14. The miniature image capture lens as claimed in claim 1, wherein miniature image capture lens reduces optical dispersion according to the first, second, third, and fourth lenses at the specific condition.

15. The miniature image capture lens as claimed in claim 1, wherein each of the first and second lenses has aspect ration less than the third and fourth lenses.

16. A miniature image capture lens, comprising:
    an aperture diaphragm having an aperture through which an image is captured; and
    a wafer scale lens system, comprising:
        a first lens group, including:
            a first substrate;
            a first lens disposed on a first side of the first substrate; and a second lens disposed on a second side of the first substrate; and a second lens group, including:

a second substrate;

a third lens disposed on a first side of the second substrate; and a fourth lens disposed on a second side of the second substrate, wherein the first lens, the second lens, the third lens and the fourth lens are aspherical, one of the first lens and the second lens, and one of the third lens and the fourth lens have a high refraction index Nd_h and a high abbe number Vd_h, another one of the first lens and the second lens, and another one of the third lens and the fourth lens have a low refraction index Nd_l and a low abbe number Vd_l, the high refraction index Nd_h is greater than the low refraction index Nd_l, and the high abbe number Vd_h is greater than the low abbe number Vd_l, and the miniature image capture lens meets the following conditions:

$Nd\_h = 1.58 \sim 1.62$;

$Nd\_l = 1.48 \sim 1.53$;

$Nd\_l/Nd\_h = 0.91 \sim 0.97$;

$Vd\_h = 35 \sim 45$; and $Vd\_l = 25 \sim 35$ wherein one of the first and second lenses is convex shaped and another one of the first and second lenses is concave shaped, and one of the third and fourth lenses is convex shaped and another one of the third and fourth lenses is concave shaped.

17. The miniature image capture lens as claimed in claim 16, wherein the first lens and the second lens are formed of different materials, and the third lens and the fourth lens are formed of different materials.

18. The miniature image capture lens as claimed in claim 16, wherein the miniature image capture lens reduces optical dispersion according to the first, second, third, and fourth lenses at the specific condition.

19. The miniature image capture lens as claimed in claim 16, wherein each of the first and second lenses has aspect ration less than the third and fourth lenses.

20. The miniature image capture lens as claimed in claim 16, further comprising an IR cut filter coated on the first lens of the first lens group.

* * * * *